United States Patent
Nguyen et al.

(10) Patent No.: US 6,917,364 B2
(45) Date of Patent: Jul. 12, 2005

(54) METHOD AND APPARATUS FOR MANAGING TEXTURE MEMORY IN A DATA PROCESSING SYSTEM

(75) Inventors: Truc Duy Nguyen, Austin, TX (US); Mark Richard Nutter, Austin, TX (US); Robert Paul Stelzer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 09/773,188

(22) Filed: Jan. 31, 2001

(65) Prior Publication Data

US 2002/0101427 A1 Aug. 1, 2002

(51) Int. Cl.[7] .................................................. G09G 5/39
(52) U.S. Cl. ........................ 345/531; 345/543; 345/552; 345/582; 345/538
(58) Field of Search ................................ 345/531, 552, 345/537, 538, 557, 543, 430, 425, 541–544, 582–588; 711/133–136, 171–173

(56) References Cited

U.S. PATENT DOCUMENTS

| | | | | |
|---|---|---|---|---|
| 5,790,130 A | * | 8/1998 | Gannett | ...................... 345/587 |
| 5,917,497 A | * | 6/1999 | Saunders | |
| 6,295,068 B1 | * | 9/2001 | Peddada et al. | |
| 6,326,975 B1 | * | 12/2001 | Shaw | |
| 6,600,493 B1 | * | 7/2003 | Sethi et al. | .................. 345/543 |

* cited by examiner

*Primary Examiner*—Matthew C. Bella
*Assistant Examiner*—Hau Nguyen
(74) *Attorney, Agent, or Firm*—Duke W. Yee; Mark E. McBurney; Wayne P. Bailey

(57) ABSTRACT

A method, apparatus, and computer implemented instructions for managing a set of memory resources used to store texture objects in a data processing system. A texture manager allocates memory to a current texture object in a set of memory resources. A stored texture object, handled by the texture manager, is selectively removed in response to an inability to allocate sufficient memory to the current texture object. The allocating and selectively removing steps are repeated until the current texture object is allocated sufficient memory. The repeating step is halted in response to an absence of any stored texture objects, handled by a texture manager, being present in the first memory resource. Stored texture objects, handled by another texture manager, are selectively removed in response to an inability to allocate sufficient memory to the current texture object. Memory is allocated in the set of memory resources to the current texture object in response to selectively removing stored texture objects.

29 Claims, 3 Drawing Sheets

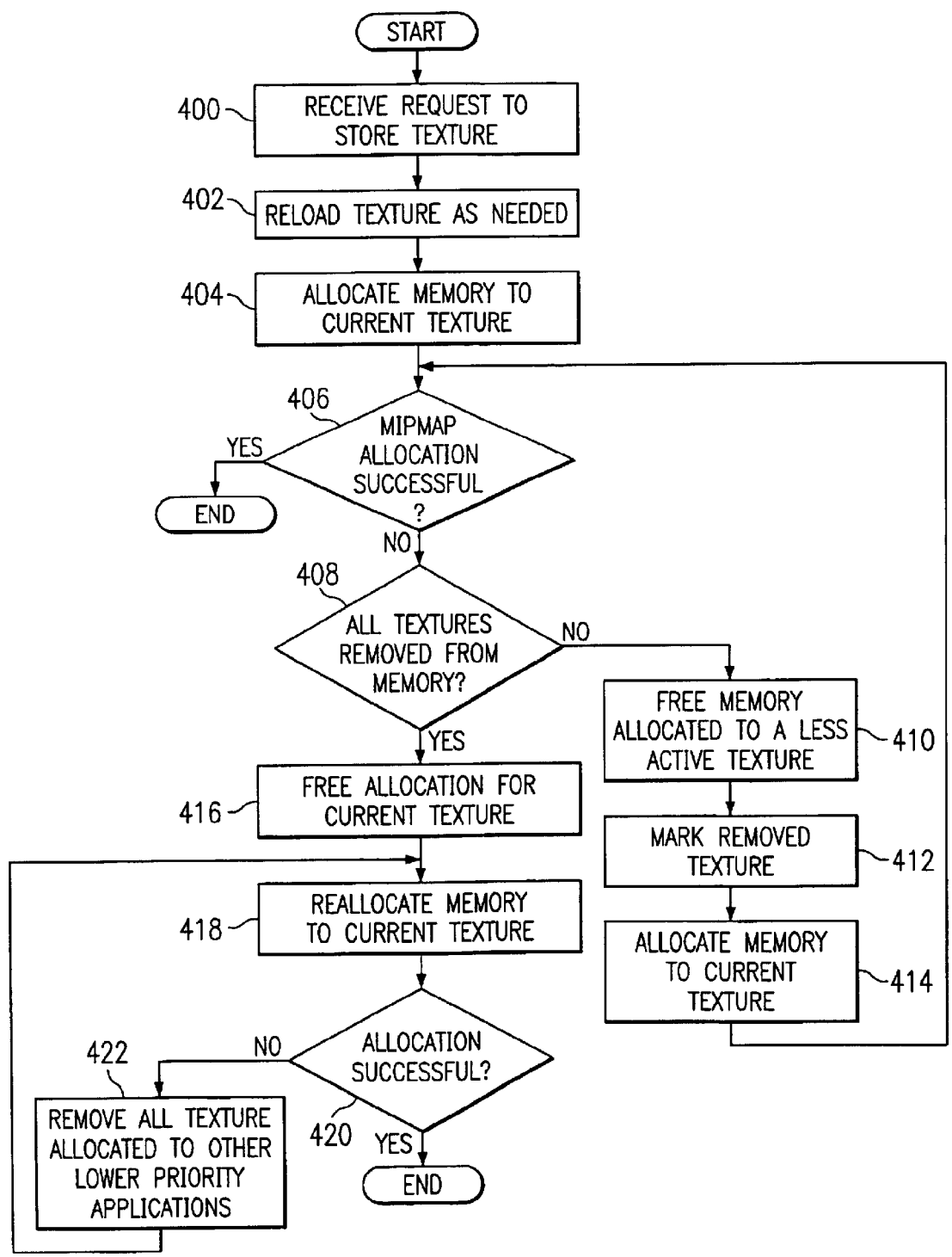

METHOD AND APPARATUS FOR MANAGING TEXTURE MEMORY IN A DATA PROCESSING SYSTEM

BACKGROUND OF THE INVENTION

1. Technical Field

The present invention relates generally to an improved data processing system, and in particular to a method and apparatus for managing graphic data. Still more particularly, the present invention relates to a method and apparatus for managing texture memory in a data processing system.

2. Description of Related Art

Data processing systems, such as personal computers and work stations, are commonly utilized to run computer-aided design (CAD) applications, computer-aided manufacturing (CAM) applications, and computer-aided software engineering (CASE) tools. Engineers, scientists, technicians, and others employ these applications daily. These applications involve complex calculations, such as finite element analysis, to model stress in structures. Other applications include chemical or molecular modeling applications. CAD/CAM/CASE applications are normally graphics intensive in terms of the information relayed to the user. Data processing system users may employ other graphics intensive applications, such as desktop publishing applications. Generally, users of these applications require and demand that the data processing systems be able to provide extremely fast graphics information.

The processing of a graphics data stream to provide a graphical display on a video display terminal requires an extremely fast graphics system to provide a display with a rapid response. In these types of graphics systems, primitives are received for processing and display. A primitive is a graphics element that is used as a building block for creating images, such as, for example, a point, a line, a triangle, a polygon, or a quadrilateral. A primitive is defined by a group of one or more vertices. A vertex defines a point, an end point of an edge, or a corner of a polygon where two edges meet. Data also is associated with a vertex in which the data includes information, such as positional coordinates, colors, normals, and texture coordinates. Commands are sent to the graphics system to define how the primitives and other data should be processed for display.

These commands are processed to generate two dimensional and three dimensional images. A texture is a digital representation of the surface of an object. In addition to two-dimensional qualities, such as color and brightness, the texture is also encoded with three-dimensional properties, such as how transparent and reflective the object is. Once the texture has been defined, the texture can be wrapped around any 3-dimensional object. This process is called texture mapping.

Well-defined textures are very important for rendering realistic 3-D images. However, these textures also require a lot of memory, so they are not used as often as they might be. This requirement is one of the rationales for the development of the new graphics interface, advanced graphic port (AGP), which allows texture to be stored in main memory, which is more expansive than video memory. AGP also speeds up the transfer of large textures between memory, the CPU and the video adapter.

Currently, systems allow applications to use both video memory on the graphics adapter as well as main memory to store and use textures. Additionally, applications and application program interfaces (APIs) may use this texture memory, which is made up of video memory and AGP memory. OpenGL and Direct3D are examples of code operating in different levels of the operating system. OpenGL runs in application space, also referred to as "client space", and Direct3D operates in kernel space. OpenGL is a graphics programming language by Silicon Graphics Incorporated. Direct3D is an application program interface (API) for manipulating and displaying 3-dimensional objects, developed by Microsoft Corporation. Each of these software systems pre-allocates a large amount of texture memory regardless of how much memory is required.

Such a mechanism is inefficient because the amount of memory required is unknown and a condition may exist in which one application has insufficient memory, while another application wastes extra, unneeded memory.

Therefore, it would be advantageous to have an improved method and apparatus for managing texture memory.

SUMMARY OF THE INVENTION

The present invention provides a method, apparatus, and computer implemented instructions for managing a set of memory resources used to store texture objects in a data processing system. A texture manager allocates memory to a current texture object in a set of memory resources. A stored texture object, handled by the texture manager, is selectively removed in response to an inability to allocate sufficient memory to the current texture object. The allocating and selectively removing steps are repeated until the current texture object is allocated sufficient memory. The repeating step is halted in response to an absence of any stored texture objects, handled by a texture manager, being present in the first memory resource. Stored texture objects, handled by another texture manager, are selectively removed in response to an inability to allocate sufficient memory to the current texture object. Memory is allocated in the set of memory resources to the current texture object in response to selectively removing stored texture objects.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a flowchart of a process used for managing texture memory in accordance with a preferred embodiment of the present invention.

DETAILED DESCRIPTION OF THE PREFERRED EMBODIMENT

Figure 1:
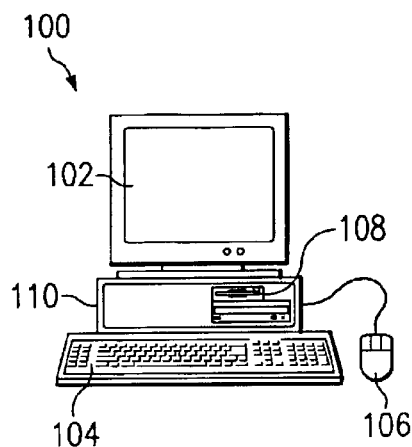
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
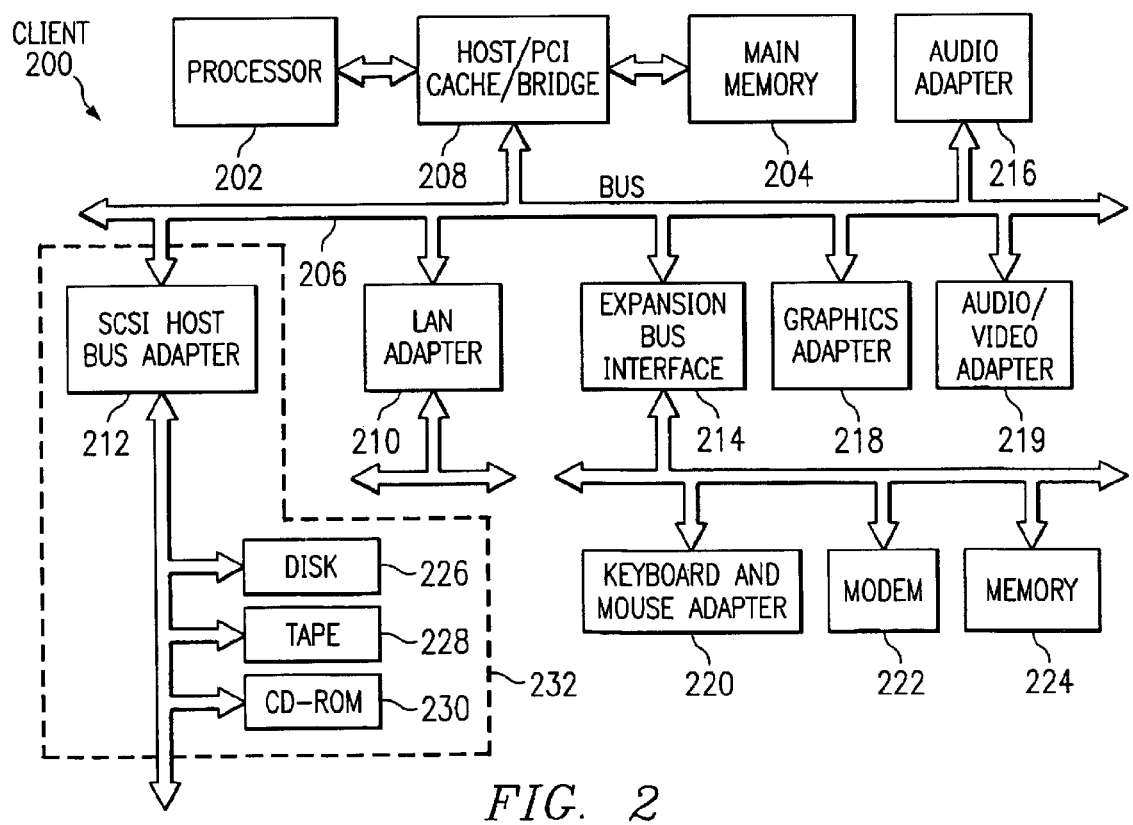
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. Portions of main memory 204 may be allocated as texture memory, such as AGP memory, which may be used by applications and APIs for storing textures. PCI bridge 208 also may include an integrated memory controller and cache memory for processor 202. Additional connections to PCI local bus 206 may be made through direct component interconnection or through add-in boards.

In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. For example, graphics adapter 218 contains video memory, which also may be used to store textures.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

The present invention provides a method, apparatus, and computer implemented instructions for managing textures and texture memory in a data processing system, such as data processing system 200. The mechanism of the present invention provides a seamless integration of texture memory for use by applications and APIs operating at different levels within an operating system.

Figure 3:
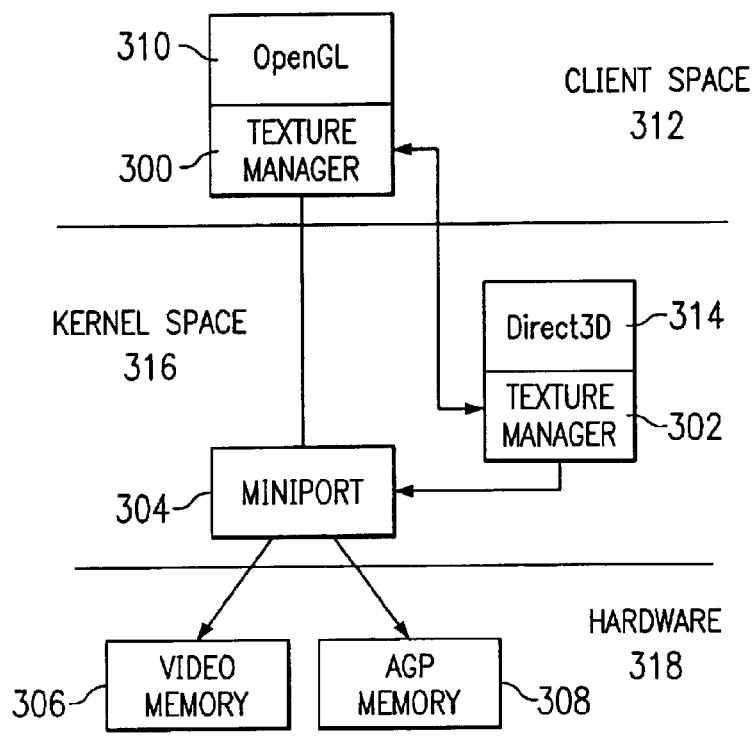
FIG. 3 is a diagram of a texture management system in accordance with a preferred embodiment of the present invention.

Turning next to FIG. 3, a diagram of a texture management system is depicted in accordance with a preferred embodiment of the present invention. In this example, texture manager 300, texture manager 302, and miniport 304 are components used to manage video memory 306 and AGP memory 308. Miniport 304 serves as a center point to allocate and free texture memory within video memory 306 and AGP memory 308. In other words, miniport 304 is a memory resource manager.

In the depicted examples, texture manager 300 is associated with OpenGL application 310 and located in client space 312. Texture manager 302 is associated with Direct3D API 314 and is located within kernel space 316. Video memory 306 and APG memory 308 are located in hardware 318. Specifically, video memory 306 may be, for example, a frame buffer and a graphic adapter, such as graphic adapter 218 in FIG. 2. APG memory 308 may be located within main memory 204 in FIG. 2.

Although this example illustrates the use of an OpenGL application and a Direct3D API, the mechanism of the present invention may be applied to other applications and APIs operating in client space 312 and kernel space 316.

Each texture manager, texture manager 300 and texture manager 302, allocates and frees texture memory through command to miniport 304. This is performed by each texture manager as if each, one owned all of the texture manager resources. The actual allocation and free of texture memory is performed by miniport 304. Each texture manager keeps track of its allocations for all textures. If miniport 304 fails to allocate a texture memory as requested, the texture manager boots the least active texture to make room for the new allocations. After freeing miniport 304 is again called to allocate texture memory. The process continues until the allocation succeeds or no more textures are present to be freed. If no more textures are present, texture manager 302 returns a failure. On the other hand, texture manager 300 will free up memory by removing textures handled by texture manager 302. In these examples, texture manager 300 has a higher priority over texture manager 302 and is allowed to remove textures handled by texture manager 302.

Turning next to FIG. 4, a flowchart of a process used for managing texture memory is depicted in accordance with a preferred embodiment of the present invention. The process illustrated in FIG. 4 may be implemented in a texture manager, such as texture manager 300 or 302 in FIG. 3. This process is applied to both video memory and memory in the data processing system for storing textures.

The process begins by receiving a request to store a texture in texture memory (step 400). A texture is reloaded as needed (step 402). Texture memory is then allocated to the current texture in the request (step 404). In this example, the allocation occurs through a call made by the texture manager to a miniport or other memory allocation mechanism. A determination is made as to whether the allocation was successful (step 406). In this example, allocations are done on a per mipmap basis. A texture object consists of one or inert mipmaps starting from level 0 and the allocation always begins with mipmap 0, then 1, and so on. A mipmap is a reduced resolution version of a texture map, used to texture a geomenic primitive whose screen resolution differs from the resolution of the source texture map.

The allocation is successful if sufficient memory is present to store the current texture. If the allocation is successful, the process terminates.

If the allocation is unsuccessful, a determination is made as to whether all textures have been removed from the texture memory (step 408). This determination in step 406 is made with respect to texture objects handled or tracked by the texture manager.

If one or more textures are still present in the texture memory, then a less active texture is removed (step 410). A less active texture may be identified by comparing the use of a particular texture in rendering an object to a threshold. Each time a texture is activated, it is assigned a unique global value, which gets decreased by one after each use. This value will be used to determine how active a texture relative to another texture by comparing the value of this texture to the value of the other texture. A texture with largest number is the least active one.

The removed texture is marked (step 412). If a texture is removed from APG memory, this texture is marked as a APG texture such that when it is reactivated or loaded again, this texture will be loaded into APG memory. If the texture is removed from video memory, it is marked as a video texture so that this texture will be reloaded into video memory the next time it is requested for use. Memory is allocated to the current texture object (step 414) with the process then returning to step 406 as described above.

With reference again to step 408, if all of the texture objects have been removed from texture memory, then allocation of memory to the current texture object is freed (step 416). This step occurs because if the allocation fails after all textures are freed, a fragmented memory situation may be present. Then, memory is reallocated to the current texture (step 418). In this case, steps 416 and 418 free memory allocated to the texture and reperforms the allocation starting from mipmap level zero. A texture object consists of one or more mipmaps starting from level 0 and the allocation always begins with mipmap 0, then 1, and so on.

Because texture objects are being allocated and freed, this could cause fragmentation in the memory and a mipmap level 0 could be allocated anywhere in the memory while next mipmaps (of the same object) could be allocated far from it. This allocation may lead to failure of subsequent mipmap allocation even though the total available space is larger than the sum of all mipmaps of the texture object.

In this case, the current object being allocated will be freed and re-allocated from mipmap level 0. This process will allocate more mipmaps sequentially and thus, the entire object may be allocated successfully without further work.

Thereafter, a determination is made as to whether the allocation is successful (step 420). If the allocation is unsuccessful, textures allocated to lower priority processes are removed (step 422) with the process then returning to step 416 as described above. A single texture may be removed or all of the textures may be removed in step 422 depending on the particular implementation. These processes may be applications or APIs. For example, an OpenGL application has a higher priority than a Direct3D API. Thus, a texture manager associated with the OpenGL application would be allowed to remove textures allocated for the Direct3D API by the texture manager associated with this API.

If the allocation is successful, the process terminates. If this process is implemented in a texture manager associated with a lower priority process, then step 422 is replaced with a step in which an error or message indicating an allocation failure is returned.

Figure 5:
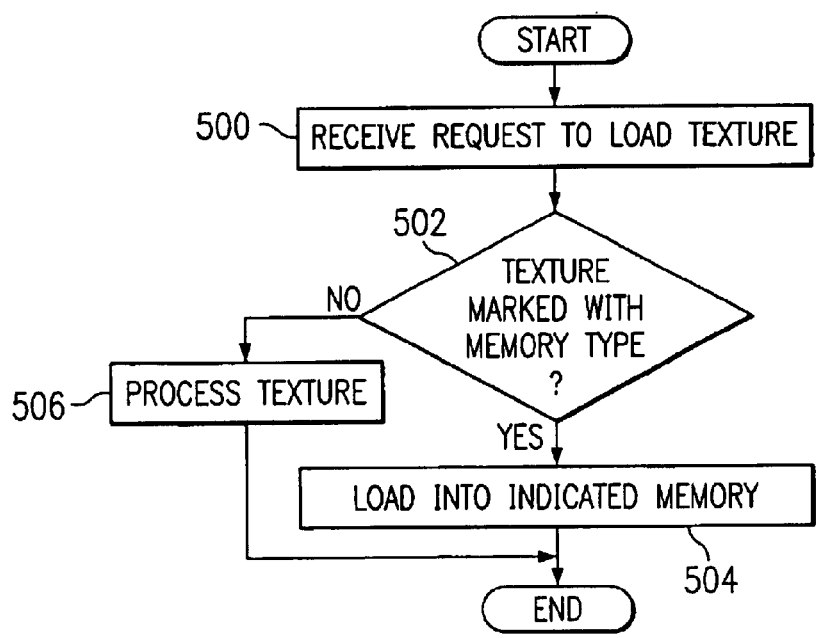
FIG. 5 is a flowchart of a process used for reloading textures in accordance with a preferred embodiment of the present invention.

Turning now to FIG. 5, a flowchart of a process used for reloading textures is depicted in accordance with a preferred embodiment of the present invention. The process illustrated in FIG. 5 is a more detailed illustration of step 402 in FIG. 4. The process begins by receiving a request to load a texture (step 500). A determination is made as to whether a texture is marked with a memory type (step 502). If the texture is marked with a memory type, then the texture is loaded into the type of memory indicated (step 504) with the process terminating thereafter. For example, if the texture is marked as being a video texture, then the texture is placed into video memory. If the texture is marked as an AGP texture, the texture is placed into AGP memory.

With reference again to step 502, if the texture is not marked with a memory type, the texture is then processed and placed into a memory (step 506) with the process terminating thereafter. A number of reasons exist for assigning a texture to a memory type. One is as a request by an application. This reason is a Direct 3D feature. Otherwise the assignment is determined by texture manager based on the size of the texture. Large sized textures are placed in AGP memory so that they will not be required swapped as often. When a less active texture is swapped out of video memory, and if it is not requested to be in video memory, this texture assigned to AGP memory. The next time the texture is used, this texture would be re-loaded into AGP memory.

Thus the present invention provides an improved method and apparatus for managing texture memory. This mechanism allows for reallocation of memory between different processes with may operated at different levels in an operating system. The mechanism involves freeing or removing textures handled by a texture manager to allocate memory for a current or new texture that is to be used in rendering an image. If all of the textures handled by a first texture manager are freed, the first texture manager may instruct a second texture manager to remove textures handled by it if the first texture manager has priority over the second texture manager. If a priority does not exist, a message or error may be returned to indicate a failure in allocating memory for a texture.

Although the depicted examples show an OpenGL application having priority over a Direct3D API, the priorities may be reversed to give the Direct3D API priority.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing a set of memory resources used to store texture objects, the data processing system comprising a first memory resource with at least one stored texture object, the method comprising:

allocating memory to a current texture object in the first memory resource within the set of memory resources;

selectively removing a stored texture object in the first memory resource in response to an inability to allocate sufficient memory to the current texture object;

repeating the allocating and selectively removing steps if there is another stored texture object present in the first memory resource until the current texture object is allocated sufficient memory, wherein the repeated selectively removing step is with respect to the another stored texture object;

halting the repeating step in response to an absence of any stored texture objects being present in the first memory resource;

responsive to the halting step, selectively removing stored texture objects in a second memory resource if an inability to allocate sufficient memory to the current texture object is present; and allocating memory in the second memory resource to the current texture object in response to selectively removing stored texture objects.

2. The method of claim 1, wherein the first memory resource is system memory.

3. The method of claim 1, wherein the first memory resource is an advanced graphic port memory.

4. The method of claim 1, wherein the second memory resource is a frame buffer.

5. The method of claim 1, wherein the secondary memory resource is assigned to a kernel application.

6. The method of claim 1, wherein the first memory resource is assigned to a client application.

7. The method of claim 1, wherein the stored texture object is a texture object used less than a threshold value.

8. The method of claim 1, wherein the step of selectively removing texture objects comprises:

selectively removing all stored texture objects in the second memory resource in response to an inability to allocate sufficient memory to the current texture object.

9. The method of claim 1, wherein the step of selectively removing texture objects comprises:

selectively removing a single stored texture object in the second memory resource in response to an inability to allocate sufficient memory to the current texture object.

10. The method of claim 1, wherein an identifier is associated with a texture object when the texture object is removed from the set of memory resources in which the identifier identifies a memory resource in which the texture object was located within the set of memory resources.

11. A memory management system for a first memory resource and a second memory resource, the first memory resource having at least one stored texture object, comprising:

a memory allocation unit, wherein the memory allocation unit allocates memory to texture objects in the first memory resource and the second memory resource;

a texture management system, wherein the texture management system tracks allocation of memory for all texture objects, removes a stored texture object within the first memory resource in response to detecting an inability to allocate memory to a current texture object in the first memory resource, calls the memory allocation unit to allocate memory to the current texture object after the stored texture object is removed, and continues to remove texture objects from the first memory resource until sufficient memory is allocated to the current texture object.

12. The memory management system of claim 11, wherein the texture management system returns an error if stored texture objects are absent from the first memory resource and insufficient memory has been allocated to the current texture object.

13. The memory management system of claim 11, wherein the texture management system removes texture objects from the second memory resource if texture objects are absent from the first memory resource and insufficient memory has been allocated to the current memory object.

14. The memory management system of claim 11, wherein the texture management system includes a first texture manager and a second texture manager, wherein the first texture manager track allocation of memory for all texture objects in the first memory resource and wherein the second texture manager track allocation of memory for all texture objects in the second memory resource.

15. A data processing system comprising:

a bus system;

a memory connected to the bus system, wherein a set of instructions are located in the memory; and a processor unit connected to the bus system, wherein the processor unit executes the set of instructions to allocate memory to a current texture object in a first memory resource within the set of memory resources; selectively remove a stored texture object in the first memory resource in response to an inability to allocate sufficient memory to the current texture object, repeat instructions to the allocate memory and selectively remove a stored texture object until the current texture object is allocated sufficient memory; halt the repeating in response to an absence of any stored texture objects being present in the first memory resource, selectively remove stored texture objects in a second memory resource in response to an inability to allocate sufficient memory to the current texture object in response to halting instructions to repeat; and allocate memory in the second memory resource to the current texture object in response to selectively removing stored texture objects.

16. The data processing system of claim 15, wherein the bus system includes a primary bus and a secondary bus.

17. The data processing system of claim 15, wherein the processor unit includes a single processor.

18. The data processing system of claim 15, wherein the processor unit includes a plurality of processors.

19. A data processing system for managing a set of memory resources used to store texture objects, the data processing system comprising a first memory resource with at least one stored texture object, the data processing system further comprising:

first allocating means for allocating memory to a current texture object in the first memory resource within the set of memory resources;

first selectively removing means for selectively removing a stored texture object in the first memory resource in response to an inability to allocate sufficient memory to the current texture object;

repeating means for repeating initiation of the first allocating means and first selectively removing means if there is another stored texture object present in the first memory resource until the current texture object is allocated sufficient memory, wherein the repeated initiation of the first selectively removing means is with respect to the another stored texture object;

halting means for halting the repeating means in response to an absence of any stored texture objects being present in the first memory resource;

second selectively removing means, responsive to the halting step, for selectively removing stored texture objects in a second memory resource if an inability to allocate sufficient memory to the current texture object is present; and second allocating means for allocating memory in the second memory resource to the current texture object in response to selectively removing stored texture objects.

20. The data processing system of claim 19, wherein the first memory resource is system memory.

21. The data processing system of claim 19, wherein the first memory resource is an advanced graphic port memory.

22. The data processing system of claim 19, wherein the second memory resource is a frame buffer.

23. The data processing system of claim 19, wherein the secondary memory resource is assigned to a kernel application.

24. The data processing system of claim 19, wherein the first memory resource is assigned to a client application.

25. The data processing system of claim 19, wherein the stored texture object is a texture object used less than a threshold value.

26. The data processing system of claim 19, wherein the step of selectively removing texture objects comprises:

third selectively removing means for selectively removing all stored texture objects in the second memory resource in response to an inability to allocate sufficient memory to the current texture object.

27. The data processing system of claim 19, wherein the step of selectively removing texture objects comprises:

fourth selectively means for selectively removing a single stored texture object in the second memory resource in response to an inability to allocate sufficient memory to the current texture object.

28. The data processing system of claim 19, wherein an identifier is associated with a texture object when the texture object is removed from the set of memory resources in which the identifier identifies a memory resource in which the texture object was located within the set of memory resources.

29. A computer program product in a computer readable medium for managing a set of memory resources used to store texture objects, the computer program product comprising:

first instructions for allocating memory to a current texture object in a first memory resource within the set of memory resources;

second instructions for selectively removing a stored texture object in the first memory resource in response to an inability to allocate sufficient memory to the current texture object;

third instructions for repeating the allocating and selectively removing steps if there is another stored texture object present in the first memory resource until the current texture object is allocated sufficient memory, wherein the repeated second instructions for selectively removing is with respect to the another stored texture object;

fourth instructions for halting the repeating step in response to an absence of any stored texture objects being present in the first memory resource;

fifth instructions, responsive to the halting step, for selectively removing stored texture objects in a second memory resource if an inability to allocate sufficient memory to the current texture object is present; and sixth instructions for allocating memory in the second memory resource to the current texture object in response to selectively removing stored texture objects.

* * * * *